United States Patent
Carey et al.

(10) Patent No.: US 6,594,100 B2
(45) Date of Patent: Jul. 15, 2003

(54) METHOD FOR RECORDING MAGNETIC TRANSITIONS ON RECORDING LAYER HAVING ANTIFERROMAGNETICALLY COUPLED FERROMAGNETIC FILMS

(75) Inventors: Matthew Joseph Carey, San Jose, CA (US); Eric Edward Fullerton, Morgan Hill, CA (US); Bruce Alvin Gurney, San Rafael, CA (US); Hal Jervis Rosen, Los Gatos, CA (US); Manfred Ernst Schabes, San Jose, CA (US)

(73) Assignee: Hitachi Global Storage Technologies The Netherlands B.V., Amsterdam (NL)

(*) Notice: Subject to any disclaimer, the term of this patent is extended or adjusted under 35 U.S.C. 154(b) by 0 days.

(21) Appl. No.: 09/903,959

(22) Filed: Jul. 11, 2001

(65) Prior Publication Data

US 2001/0038931 A1 Nov. 8, 2001

Related U.S. Application Data

(63) Continuation of application No. 09/416,364, filed on Oct. 8, 1999, now Pat. No. 6,280,813.

(51) Int. Cl.[7] .............................. G11B 5/03; G11B 5/66; G11B 5/70
(52) U.S. Cl. ................................ 360/66; 428/694 TM
(58) Field of Search .................... 428/694 TM, 694 TS, 428/65.3, 65.5, 65.7, 694 EC; 360/97.01, 55, 48, 46, 66; 369/288, 283

(56) References Cited

U.S. PATENT DOCUMENTS

| | | | |
|---|---|---|---|
| 4,789,598 A | 12/1988 | Howard et al. | 428/408 |
| 5,051,288 A | 9/1991 | Ahlert et al. | 428/64 |
| 5,408,377 A | 4/1995 | Gurney et al. | 360/113 |
| 5,462,796 A * | 10/1995 | Teng et al. | 428/336 |
| 5,465,185 A * | 11/1995 | Heim et al. | 360/113 |
| 5,523,173 A | 6/1996 | Doerner et al. | 428/611 |
| 5,580,667 A | 12/1996 | Lal et al. | 428/610 |
| 5,607,740 A | 3/1997 | Noda | 428/65.3 |
| 5,688,380 A | 11/1997 | Koike et al. | 204/192.2 |
| 5,756,202 A * | 5/1998 | Van Kesteren et al. | 428/332 |
| 5,834,111 A * | 11/1998 | Lal et al. | 428/332 |
| 5,851,656 A | 12/1998 | Ohkubo | 428/332 |
| 5,898,549 A | 4/1999 | Gill | 360/113 |
| 6,280,813 B1 * | 8/2001 | Carey et al. | 428/65.3 |

FOREIGN PATENT DOCUMENTS

| | | |
|---|---|---|
| EP | 0892393 A1 | 1/1999 |
| WO | WO96/24927 | 8/1996 |
| WO | WO97/34295 | 9/1997 |

OTHER PUBLICATIONS

S. E. Lambert et al., *Reduction of Media Noise in Thin Film Metal Media by Lamination*, IEEE Transactions on Magnetics, vol. 26, No. 5, Sep. 1990, pp. 2706–2708.

(List continued on next page.)

*Primary Examiner*—Holly C. Rickman
(74) *Attorney, Agent, or Firm*—Thomas R. Berthold

(57) ABSTRACT

A method for writing data on a magnetic recording medium includes providing a magnetic recording layer having at least two ferromagnetic films antiferromagnetically coupled together across a nonferromagnetic spacer film, with one of the ferromagnetic films having a greater magnetic moment than the other. A positive write field is applied to a first region to align the moments of both ferromagnetic films with the positive field, and then a negative write field is applied to an adjacent region to align the moments of both ferromagnetic films with the negative field. When the medium is moved away from the write fields, the moment of the ferromagnetic film with the lesser moment in each region flips to be antiparallel to the moment of the other ferromagnetic film in its region. The result is that the adjacent regions become adjacent magnetized domains with the transition between the domains representative of the written data.

3 Claims, 3 Drawing Sheets

OTHER PUBLICATIONS

E. S. Murdock et al., *Noise Properties of Multilayered Co–Alloy Magnetic Recording Media,* IEEE Transactions on Magnetics, vol. 26, No. 5, Sep. 1990, pp. 2700–2705.

A. Murayama et al., *Interlayer Exchange Coupling in Co/Cr/Co Double–Layered Recording Films Studied by Spin–Wave Brillouin Scattering,* IEEE Transactions on Magnetics, vol. 27, No. 6, Nov. 1991, pp. 5064–5066.

S. E. Lambert et al., *Laminated Media for High Density Recording,* IEEE Transactions on Magnetics, vol. 29, No. 1, Jan. 1993, pp. 223–229.

E. Teng et al., *Flash Chromium Interlayer for High Performance Disks with Superior Noise and Coercivity Squareness,* IEEE Transactions on Magnetics, vol. 29, No. 6, Nov. 1993, pp. 3679–3681.

S. S. P. Parkin et al., *Oscillations in Exchange Coupling and Magnetoresistance in Metallic Superlattice Structures: Co/Ru, Co/Cr, and Fe/Cr,* Physical Review Letters, 1990 The American Physical Society, vol. 64, No. 19, May 7, 1990, pp. 2304–2307.

\* cited by examiner

METHOD FOR RECORDING MAGNETIC TRANSITIONS ON RECORDING LAYER HAVING ANTIFERROMAGNETICALLY COUPLED FERROMAGNETIC FILMS

RELATED APPLICATION

This application is a continuation of application Ser. No. 09/416,364 filed Oct. 8, 1999 now U.S. Pat. No. 6,280,813 and entitled "MAGNETIC RECORDING MEDIA WITH ANTIFERROMAGNETICALLY COUPLED FERROMAGNETIC FILMS AS THE RECORDING LAYER".

TECHNICAL FIELD

This invention relates generally to magnetic recording media, and more particularly to thermally stable high density media.

BACKGROUND OF THE INVENTION

Conventional magnetic recording media, such as the magnetic recording disks in hard disk drives, typically use a granular ferromagnetic layer, such as a sputter-deposited cobalt-platinum (CoPt) alloy, as the recording medium. Each magnetized domain in the magnetic layer is comprised of many small magnetic grains. The transitions between magnetized domains represent the "bits" of the recorded data. IBM's U.S. Pat. Nos. 4,789,598 and 5,523,173 describe this type of conventional rigid disk.

As the storage density of magnetic recording disks has increased, the product of the remanent magnetization Mr (the magnetic moment per unit volume of ferromagnetic material) and the magnetic layer thickness t has decreased. Similarly, the coercive field or coercivity ($H_c$) of the magnetic layer has increased. This has led to a decrease in the ratio Mrt/$H_c$. To achieve the reduction in Mrt, the thickness t of the magnetic layer can be reduced, but only to a limit because the layer will exhibit increasing magnetic decay, which has been attributed to thermal activation of small magnetic grains (the superparamagnetic effect). The thermal stability of a magnetic grain is to a large extent determined by $K_u V$, where $K_u$ is the magnetic anisotropy constant of the layer and V is the volume of the magnetic grain. As the layer thickness is decreased, V decreases. If the layer thickness is too thin, the stored magnetic information will no longer be stable at normal disk drive operating conditions.

One approach to the solution of this problem is to move to a higher anisotropy material (higher $K_u$). However, the increase in $K_u$ is limited by the point where the coercivity $H_c$, which is approximately equal to $K_u$/Mr, becomes too great to be written by a conventional recording head. A similar approach is to reduce the Mr of the magnetic layer for a fixed layer thickness, but this is also limited by the coercivity that can be written. Another solution is to increase the intergranular exchange, so that the effective magnetic volume V of the magnetic grains is increased. However, this approach has been shown to be deleterious to the intrinsic signal-to-noise ratio (SNR) of the magnetic layer.

It is known that substantially improved SNR can be achieved by the use of a laminated magnetic layer of two (or more) separate magnetic layers that are spaced apart by an nonmagnetic spacer layer. This discovery was made by S. E. Lambert, et al., "Reduction of Media Noise in Thin Film Metal Media by Lamination", IEEE Transactions on Magnetics, Vol. 26, No. 5, September 1990, pp. 2706–2709, and subsequently patented in IBM's U.S. Pat. No. 5,051,288. The reduction in intrinsic media noise by lamination is believed due to a decoupling of the magnetic interaction or exchange coupling between the magnetic layers in the laminate. The use of lamination for noise reduction has been extensively studied to find the favorable spacer layer materials, including Cr, CrV, Mo and Ru, and spacer layer thicknesses, from 5 to 400 Å, that result in the best decoupling of the magnetic layers, and thus the lowest media noise. This work has been reported in papers by E. S. Murdock, et al., "Noise Properties of Multilayered Co-Alloy Magnetic Recording Media", IEEE Transactions on Magnetics, Vol. 26, No. 5, September 1990, pp. 2700–2705; A. Murayama, et al., "Interlayer Exchange Coupling in Co/Cr/Co Double-Layered Recording Films Studied by Spin-Wave Brillouin Scattering", IEEE Transactions on Magnetics, Vol. 27, No. 6, November 1991, pp. 5064–5066; and S. E. Lambert, et al., "Laminated Media Noise for High Density Recording", IEEE Transactions on Magnetics, Vol. 29, No. 1, January 1993, pp. 223–229. U.S. Pat. No. 5,462,796 and the related paper by E. Teng et al., "Flash Chromium Interlayer for High Performance Disks with Superior Noise and Coercivity Squareness", IEEE Transactions on Magnetics, Vol. 29, No. 6, November 1993, pp. 3679–3681, describe a laminated low-noise disk that uses a discontinuous Cr film that is thick enough to reduce the exchange coupling between the two magnetic layers in the laminate but is so thin that the two magnetic layers are not physically separated.

What is needed is magnetic recording media that will support very high density recording while retaining good thermal stability and SNR.

SUMMARY OF THE INVENTION

The invention is a magnetic recording medium wherein the magnetic recording layer is at least two ferromagnetic films antiferromagnetically coupled together across a non-ferromagnetic spacer film. Because the magnetic moments of the two antiferromagnetically-coupled films are oriented antiparallel, the net remanent magnetization-thickness product (Mrt) of the recording layer is the difference in the Mrt values of the two ferromagnetic films. This reduction in Mrt is accomplished without a reduction in the thermal stability of the recording medium because the volumes of the grains in the antiferromagnetically-coupled films add constructively. The medium also enables much sharper magnetic transitions to be achieved with reduced demagnetization fields, resulting in a higher linear bit density for the medium. In one embodiment the magnetic recording medium comprises two ferromagnetic films, each a granular film of a sputter deposited CoPtCrB alloy, separated by a Ru spacer film having a thickness to maximize the antiferromagnetic exchange coupling between the two CoPtCrB films. One of the ferromagnetic films is made thicker than the other, but the thicknesses are chosen so that the net moment in zero applied magnetic field is low, but nonzero.

For a fuller understanding of the nature and advantages of the present invention, reference should be made to the following detailed description taken together with the accompanying figures.

DETAILED DESCRIPTION OF THE INVENTION

Figure 1:
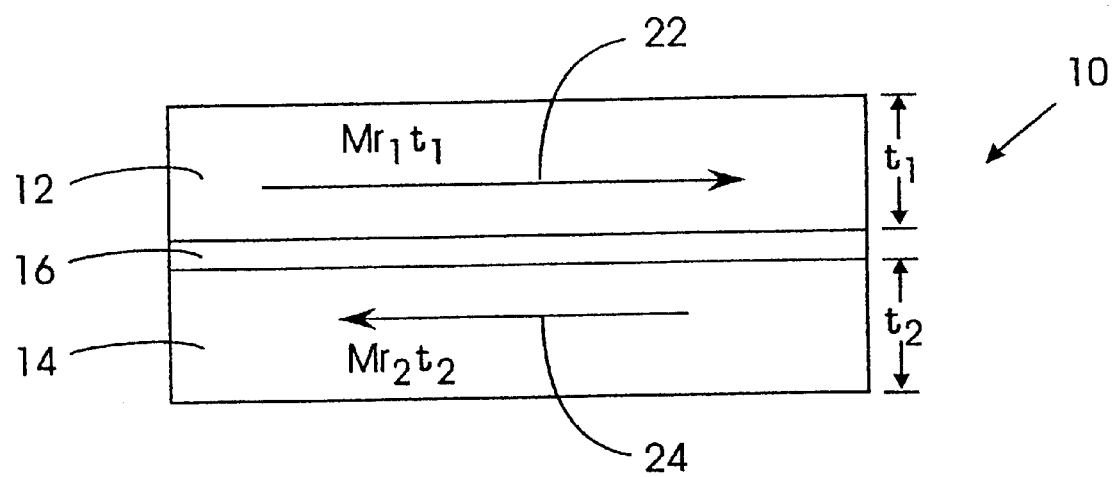
FIG. 1 is a schematic sectional view of the antiferromagnetically (AF) coupled magnetic recording layer in a recording medium according to the present invention.

The magnetic recording medium of the present invention has a recording layer formed of two or more ferromagnetic films that are exchange-coupled antiferromagnetically (AF) to their neighboring ferromagnetic films by one or more nonferromagnetic spacer films. This is shown schematically in FIG. 1 for a recording layer 10 made up of two ferromagnetic films 12, 14 separated by a nonferromagnetic spacer film 16. The nonferromagnetic spacer film 16 thickness and composition are chosen so that the magnetic moments 22, 24 of adjacent films 12, 14, respectively, are AF-coupled through the nonferromagnetic spacer film 16 and are antiparallel in zero applied fields.

The AF coupling of ferromagnetic films via a nonferromagnetic transition metal spacer film has been extensively studied and described in the literature. In general, the exchange coupling oscillates from ferromagnetic to antiferromagnetic with increasing spacer film thickness. This oscillatory coupling relationship for selected material combinations is described by Parkin et al. in "Oscillations in Exchange Coupling and Magnetoresistance in Metallic Superlattice Structures: Co/Ru, Co/Cr and Fe/Cr", *Phys. Rev. Lett.*, Vol. 64, p. 2034 (1990). The material combinations include ferromagnetic films made of Co, Fe, Ni, and their alloys, such as Ni—Fe, Ni—Co, and Fe—Co, and nonferromagnetic spacer films such as ruthenium (Ru), chromium (Cr), rhodium (Rh), iridium (Ir), copper (Cu), and their alloys. For each such material combination, the oscillatory exchange coupling relationship has to be determined, if not already known, so that the thickness of the nonferromagnetic spacer film is selected to assure antiferromagnetic coupling between the two ferromagnetic films. The period of oscillation depends on the nonferromagnetic spacer material, but the strength and phase of the oscillatory coupling also depends on the ferromagnetic material and interfacial quality. The oscillatory antiferromagnetic coupling of ferromagnetic films has been used in spin-valve type giant magnetoresistance (GMR) recording heads to design continuous magnetized antiferromagnetically coupled films whose magnetic moments are rigidly coupled together antiparallel during operation of the head. These type of spin-valve structures are described, for example, in IBM U.S. Pat. Nos. 5,408,377 and 5,465,185. The '185 patent describes a structure used in many commercially available spin-valve GMR heads, namely a laminated antiparallel pinned ferromagnetic layer having ferromagnetic films whose moments are rigidly coupled together and remain stationary during operation of the head.

The films 12, 14 have magnetic moment values of $Mr_1t_1$ and $Mr_2t_2$, respectively. (Because the remanent magnetization Mr is expressed as the magnetic moment per unit volume of ferromagnetic material, the product Mrt is the magnetic moment per unit area for a magnetic layer of thickness t.) For this AF-coupled structure the orientations of the magnetic moments 22, 24 of adjacent films 12, 14, respectively, are aligned antiparallel and thus add destructively to reduce the magnetic moment of the composite layer 10. The arrows 22, 24 represent the moment orientations of individual magnetic domains that are directly above and below one another across the AF coupling film 16. In the absence of an applied magnetic field, when the ferromagnetic film 14 is deposited onto the medium substrate, it will have a granular structure with multiple adjacent grains being coupled together to form individual magnetic domains. In the absence of an applied magnetic field the moments of these domains in film 14 will be essentially randomly oriented. The spacer film or AF-coupling film 16 is then deposited to the correct thickness directly on ferromagnetic film 14. Next, the second ferromagnetic film 12 is deposited directly on the AF coupling film 16. As the grains of ferromagnetic film 12 grow they will form magnetic domains with moment orientations that are antiparallel to the moment orientations of ferromagnetic film 14 that are directly across the AF coupling film 16.

The type of ferromagnetic material and the thickness values $t_1$, $t_2$ of the ferromagnetic films 12, 14 are chosen so that the net moment in zero applied field will be low, but nonzero. For the case shown in FIG. 1, the Mrt for the structure is given by $Mr_1t_1-Mr_2t_2$. In the preferred embodiment, $Mr_1t_1$ should be $>Mr_2t_2$. This may be accomplished by using the same ferromagnetic materials in the two films 12, 14 and having $t_1$ be greater than $t_2$, or the magnetization (the magnetic moment per unit volume of material) of the two ferromagnetic films may be made different by using different ferromagnetic materials for the two films. While FIG. 1 is shown for a two-film structure with a single spacer film 16, the invention is extendible to structures with multiple spacer films and multiple ferromagnetic films.

The present invention has a number of advantages over a magnetic layer formed as a single layer of ferromagnetic material. Low remanent magnetization can be obtained without using ultra-thin magnetic layers or low-magnetization alloys. This avoids the problems of thermal instability and difficulty in writing discussed above. If the magnetic layer in FIG. 1 is compared to a single-layer consisting of only film 12, for example, the addition of the AF-coupled ferromagnetic film 14 reduces the net magnetic moment of the composite structure without decreasing either the thickness or the magnetization of film 12.

The enhanced thermal stability of the composite structure compared to a single magnetic layer arises because the anisotropy of the grains in both films 12 and 14 are substantially uniaxial, and thus can add constructively even if the magnetic moments of films 12, 14 are antiparallel. The resulting stability parameter of the coupled system $K_uV$ is given by $Ku_1V_1<KuV<(Ku_1V_1+Ku_2V_2)$, where $Ku_1V_1$ and $Ku_2V_2$ are the anisotropy energies of typical grains in films 12, 14, respectively. The upper limit for the composite stability parameter $KuV=Ku_1V_1+Ku_2V_2$ will be achieved for the case when magnetic grains in film 12 and 14 are strongly coupled and share a common anisotropy axis direction. The magnetic volume V of the composite structure (layer 10) that determines the thermal stability will be approximately the sum of the volumes of the exchange-coupled grains in films 12 and 14, whereas the magnetic moment of layer 10 is the difference of the individual moments of films 12, 14. The antiferromagnetic coupling between the two ferromagnetic films provides a mechanism to increase the effective film thickness while reducing the net Mrt value of the composite structure. Thus the ferromagnetic films can contain very small diameter grains and maintain thermal stability.

Figure 2A:
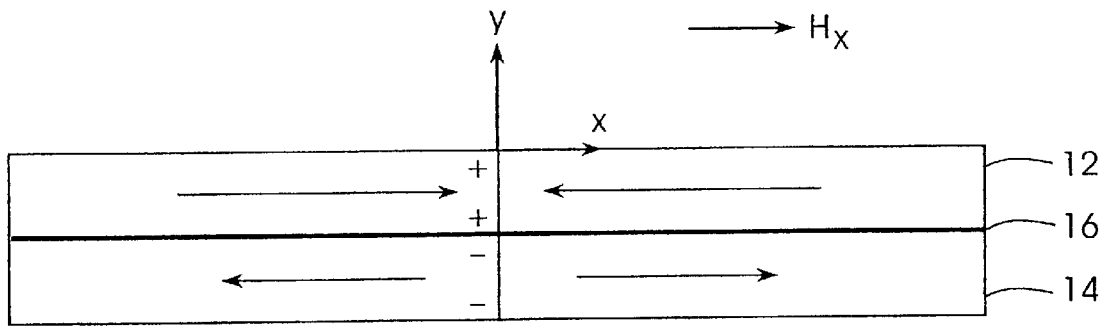
FIG. 2A is a schematic illustration of the AF-coupled layer illustrating the orientations of the moments of the ferromagnetic films at a recorded magnetic transition.
Figure 2B:
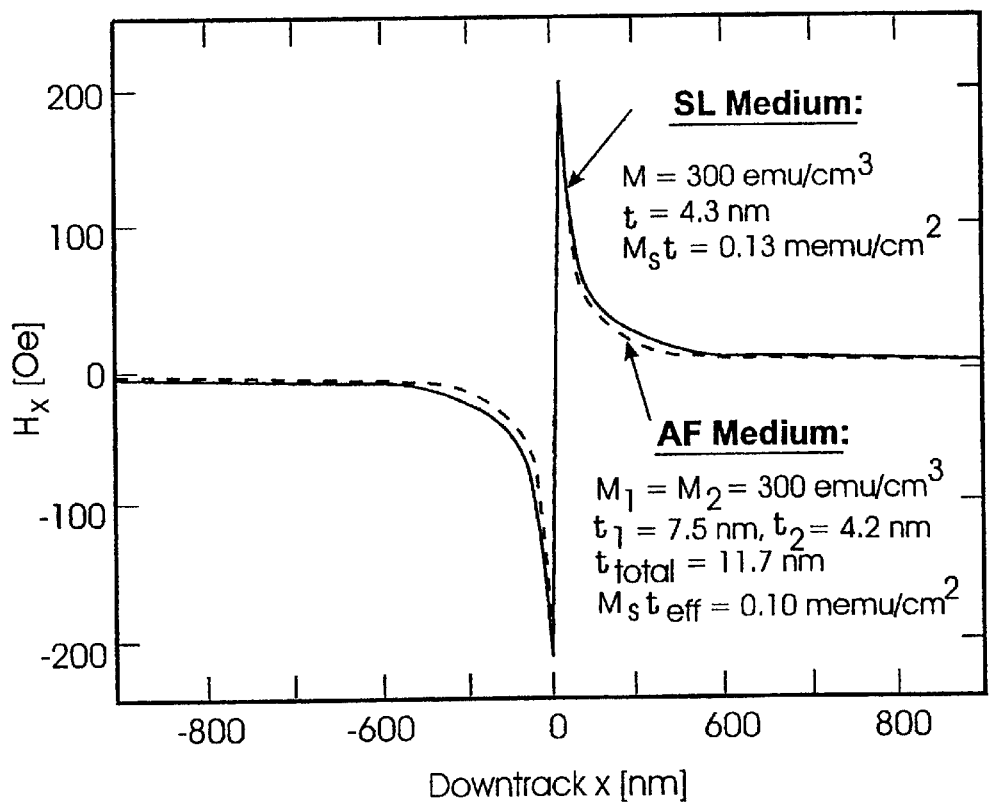
FIG. 2B is a graph of calculated magnetic field above the AF-coupled layer and a single layer (SL) medium as a function of downtrack position from a transition.

The AF-coupled medium according to the present invention is shown schematically in FIG. 2A with a recorded or written magnetic transition. The plus (+) and minus (−) symbols represent the magnetic poles arising from the transition. The calculated longitudinal field ($H_x$) 10 nm above the surface of the AF-coupled medium is shown in FIG. 2B as a function of X direction or downtrack position from the transition. The moment and thickness values for the two films 12, 14 and the calculated Mrt for the AF-coupled layer are listed in FIG. 2B. For comparison, FIG. 2B also shows model calculations of longitudinal magnetic field arising from transitions in a single-layer (SL) medium that has a similar Mrt. The thickness values ($t_1$ and $t_2$) were chosen such that the peak longitudinal field was the same for the AF-coupled medium compared to the SL medium. The total thickness of the ferromagnetic material in the AF-coupled medium is 2.7 times thicker. Therefore, the AF-coupled medium should be more thermally stable than the SL medium. The longitudinal field profile in the downtrack direction decays faster for the AF-coupled medium, resulting in a sharper transition. This indicates that the transitions can be spaced closer than in the SL medium, resulting in a higher linear bit density for the medium. While not shown in FIG. 2B, calculations have also shown that the demagnetization field from a transition within the AF-coupled medium also decreases faster than in the SL medium. In addition, the magnitude and sign of the demagnetization field depends on the Y position (see FIG. 2A) within the medium. Thus for certain Y positions within the medium, the demagnetization field is reduced to zero. Small demagnetization fields are desired because they can affect other transitions and cause the transition to demagnetize itself.

Figure 3:
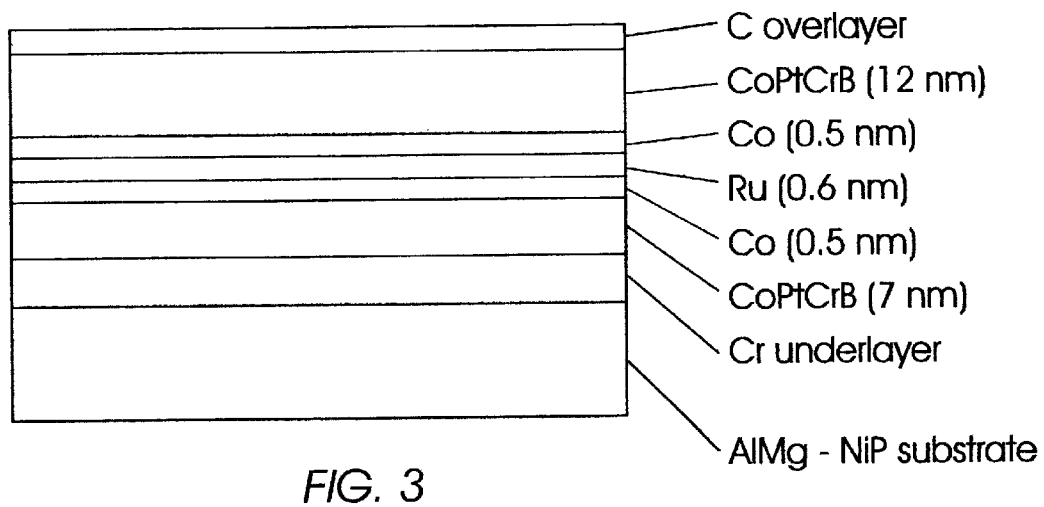
FIG. 3 is a schematic sectional view of the disk structure of the present invention illustrating the substrate, underlayer, the films in the AF-coupled layer, and the protective overcoat.

The present invention has been demonstrated using conventional CoPtCrB longitudinal recording media alloys for the ferromagnetic films. An example structure is shown in FIG. 3. The structure was fabricated using conventional sputter deposition equipment and processes. The films forming the structure were grown onto a Cr underlayer deposited onto a substrate of a AlMg disk blank with a nickel-phosphorous (NiP) surface coating, with the substrate temperature at approximately 200° C. The ferromagnetic films are CoPtCrB, with the top film corresponding to film 12 in FIG. 1 being thicker than the bottom ferromagnetic film corresponding to film 14 in FIG. 1 (12 nm vs. 7 nm). The nonferromagnetic spacer film is a 0.6 nm Ru film. As with single-layer media, it is advantageous to use a granular ferromagnetic material with isolated magnetic grains to lower the media noise. The Ru film thickness was chosen to be at the first antiferromagnetic peak in the oscillatory coupling relationship. For this example, each CoPtCrB ferromagnetic film included an interface film consisting essentially of 0.5 nm of Co at the interface with the Ru film. These ultra-thin Co films increase the interfacial moment between the ferromagnetic films and the Ru film, resulting in enhanced antiferromagnetic coupling. However, antiferromagnetic exchange coupling has been demonstrated without incorporating the Co interface films in the CoPtCrB ferromagnetic films.

Figure 4:
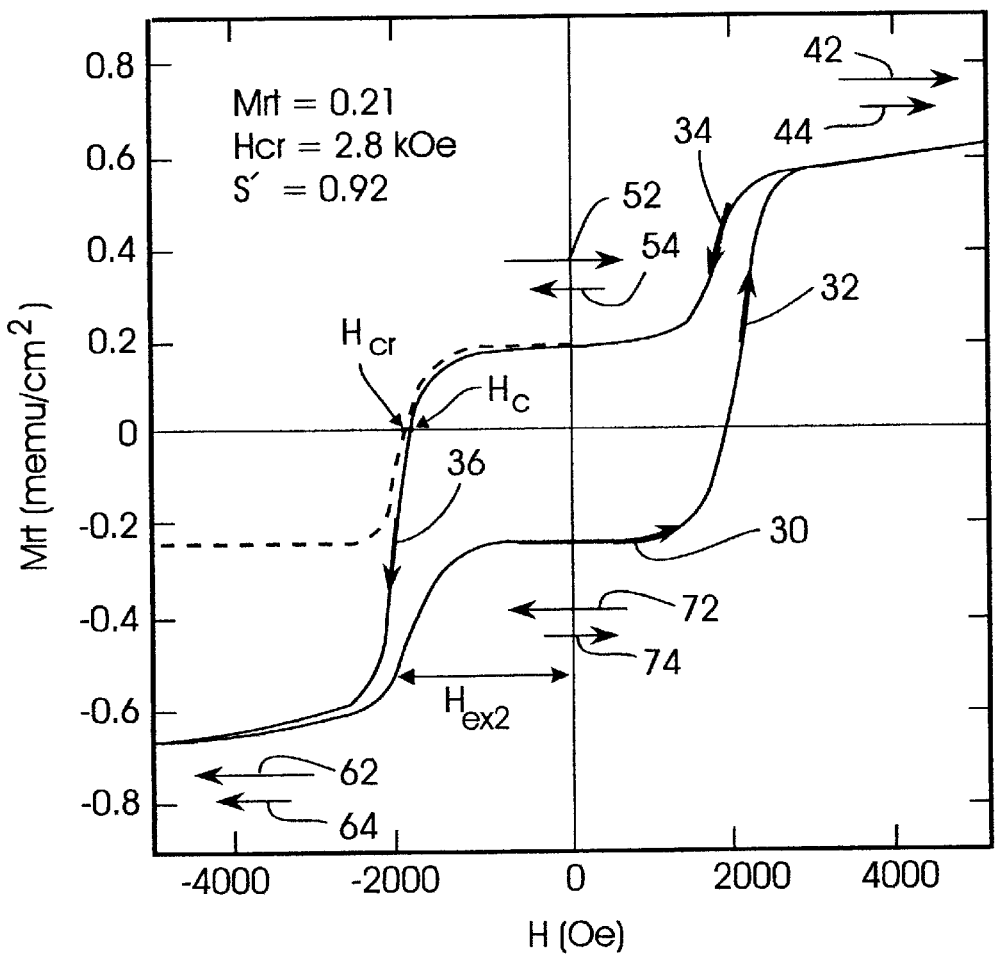
FIG. 4 is a magnetic hysteresis loop for the structure with the AF-coupled layer of FIG. 3.

FIG. 4 shows the major hysteresis loop (solid line) and the remanent hysteresis loop (dashed line) measured at T=350° K for the structure of FIG. 3. Referring first to the remanent hysteresis loop, it is obtained by saturating the AF-coupled layer in a positive field and then applying an increasing reverse negative field and measuring the remanent moment in the layer after the negative field is applied. The remanent loop is a plot of the remanent moment versus the magnitude of the reverse field. For this sample the remanent loop shows Mrt=0.21, the remanent coercive field $H_{cr}$=3.2 kOe, and S'=0.92 at room temperature, where S' is a measure of the slope of the remanent loop at $H_{cr}$. For comparison, a similarly grown 15-nm single layer of the same CoPtCrB alloy has properties of Mrt=0.38, $H_{cr}$=2.4 kOe and S'=0.76 at room temperature. Thus, the AF-coupled medium allows a significantly lower Mrt to be achieved with a greater total magnetic layer thickness.

Referring next to the major hysteresis loop of FIG. 4, the pairs of horizontal arrows indicate the orientation of the ferromagnetic films in the AF-coupled layer at different points in the hysteresis loop. The applied field is increased in the positive direction (arrows 30, 32). For large applied fields (>3000 Oe), the antiferromagnetic coupling is overcome and the moments of the two ferromagnetic films are both parallel to the applied field (arrows 42, 44). As the applied field is reduced (arrow 34) the moment of the thinner bottom ferromagnetic film reverses and becomes antiparallel to the moment of the thicker top ferromagnetic film (arrows 52, 54) and to the applied field with a drop in the net moment. This switch occurs roughly at the exchange field felt by the bottom film ($H_{ex2}$=2000 Oe) arising from the coupling across the Ru film. The value of $H_{ex2}=J_{ex}/M_2 t_2$, where $J_{ex}$ is the antiferromagnetic interface exchange energy density across the Ru spacer layer and $M_2$ and $t_2$ are the magnetization and thickness of the bottom ferromagnetic film, respectively. For an antiparallel alignment of the ferromagnetic films to be realized requires that $H_{ex2}$ exceed the coercive field required to reverse the bottom ferromagnetic film ($H_{c2}$). $H_{c2}$ is the coercive field of the bottom film, assuming no exchange interaction with the top ferromagnetic film. Thus, the magnetic properties and thickness of the bottom film, as well as the AF-coupling film, must be designed to maintain $H_{ex2} > H_{c2}$.

The remanent state after saturation in a positive field is given by the moment of the top ferromagnetic film parallel to the field direction and the moment of the bottom ferromagnetic film antiparallel to the positive field direction (arrows 52, 54). In a reverse applied field (arrow 36), the magnetic state is stable until the moment of the top ferromagnetic film reverses and the moments of both films are parallel and aligned in the negative saturation state (arrows 62, 64). The switching of the moment of the top ferromagnetic film determines the coercive field of the AF-coupled layer and is given by $H_c = H_{ex1} + H_{c1}$ where $H_{ex1}$ is the exchange field acting on the top ferromagnetic film ($H_{ex1} = J_{ex}/M_1 t_1$) and $H_{c1}$ is the coercive field of the top ferromagnetic film, assuming no interaction with the bottom ferromagnetic film. Thus, the properties of the top ferromagnetic film and the AF-coupling film must be designed to maintain $H_c$ of the composite structure below the expected write field of the head. For this example the pathway to go from one remanent state (arrows 52, 54) to the next remanent state (arrows 72, 74) goes through an intermediate state where the moments of the two films are parallel (arrows 62, 64). Thus, in contrast to AF-coupled structures used in spin-valve GMR recording heads, the moments of the ferromagnetic films in the medium according to the present invention are not rigidly coupled together across the AF-coupling film because the coupling must be overcome to write on the medium. The hysteresis loop of FIG. 4 exhibits the desired feature of an AF-coupled layer, i.e., a low remanent magnetization relative to the saturation magnetization.

Recording performance tests on the AF-coupled layer were performed using a conventional longitudinal recording head. Signal to noise ratio measurements determined a media $S_oNR$ of 31.9 dB at 9500 flux changes per millimeter (fc/mm), where $S_o$ is the isolated pulse amplitude and N is the integrated media noise at 9500 fc/mm recording density. These results demonstrate the viability of AF-coupled magnetic layers for data storage.

The AF-coupled media according to the present invention has also been demonstrated for structures with and without one or both Co interface films, with and without one or both CoCr interface layers, and with CoCrPtTa ferromagnetic films.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A method for generating magnetized states in a region of a recording layer of a magnetic recording medium comprising:

providing on the medium a magnetic recording layer comprising a first ferromagnetic film having a magnetic moment per unit area, a nonferromagnetic spacer film on the first ferromagnetic film, and a second ferromagnetic film having a magnetic moment per unit area different from the moment per unit area of the first ferromagnetic film and antiferromagnetically coupled to the first ferromagnetic film across the spacer film;

applying to said recording layer region a magnetic field in a first direction in the plane of the layer to cause the moments of the first and second ferromagnetic films in said region to align substantially parallel to said first direction;

reducing the magnetic field to said region to zero to cause the ferromagnetic film with the lesser moment in said region to flip its moment to be antiparallel to said first direction, thereby generating in said region a first magnetized state wherein the ferromagnetic film with the greater moment is oriented substantially parallel to said first direction in the absence of a magnetic field;

thereafter applying to said region magnetized in said first state a magnetic field in a second direction in the plane of the layer and antiparallel to said first direction to cause the moments of the first and second ferromagnetic films in said region to align substantially parallel to said second direction; and reducing the magnetic field to said region to zero to cause the ferromagnetic film with the lesser moment in said region to flip its moment to be antiparallel to said second direction, thereby changing the magnetic state in said region to a second magnetized state wherein the ferromagnetic film with the greater moment is oriented substantially parallel to said second direction in the absence of a magnetic field.

2. The method of claim 1 wherein providing the recording layer comprises making the moment per unit area of the second ferromagnetic film greater than the moment per unit area of the first ferromagnetic film.

3. A method for generating magnetized states in a region of a recording layer of a magnetic recording disk comprising:

providing on the disk a magnetic recording layer comprising lower and upper ferromagnetic films of an alloy comprising Co, Pt and Cr with the upper ferromagnetic film having a thickness greater than the thickness of the lower ferromagnetic film, and a transition metal spacer film between and antiferromagnetically exchange coupling the lower and upper ferromagnetic films;

applying to said recording layer region a magnetic field greater than 3000 Oe in a first direction in the plane of the layer to cause the magnetic moments of the lower and upper ferromagnetic films in said region to align substantially parallel to said first direction;

reducing the magnetic field in said region to zero to generate a first magnetized state with the moment of the lower ferromagnetic film in said region aligned antiparallel to said first direction and to the moment of the upper ferromagnetic film in said region in the absence of a magnetic field;

thereafter applying to said region magnetized in said first state a magnetic field greater than 3000 Oe in a second direction in the plane of the layer and antiparallel to said first direction to cause the magnetic moments of the lower and upper ferromagnetic films in said region to align substantially parallel to said second direction; and reducing the magnetic field in said region to zero to change the magnetized state in said region to a second magnetized state with the moment of the lower ferromagnetic film in said region aligned antiparallel to said second direction and to the moment of the upper ferromagnetic film in said region.

* * * * *